United States Patent [19]

Moran et al.

[11] Patent Number: 4,873,275

[45] Date of Patent: Oct. 10, 1989

[54] FLOW RESISTANT ASPHALT PAVING BINDER

[75] Inventors: Lyle E. Moran, Sarnia, Canada; Lawrence G. Kaufman, Somerville, N.J.

[73] Assignee: Exxon Research and Engineering Company, Florham Park, N.J.

[21] Appl. No.: 134,954

[22] Filed: Dec. 18, 1987

Related U.S. Application Data

[63] Continuation-in-part of Ser. No. 21,189, Mar. 3, 1987, abandoned.

[51] Int. Cl.$^4$ .............................................. C08L 95/00
[52] U.S. Cl. ........................................ 524/64; 524/68; 524/69
[58] Field of Search ............................... 524/64, 68, 69

[56] References Cited

U.S. PATENT DOCUMENTS

| | | |
|---|---|---|
| 3,414,533 | 12/1968 | Trieschmann et al. ................ 524/69 |
| 3,980,598 | 9/1976 | Moorwessel et al. ................ 524/69 |
| 4,098,739 | 7/1978 | Westermann ........................ 524/59 |
| 4,451,598 | 5/1984 | Decroix ................................ 524/69 |
| 4,511,889 | 4/1985 | Aldred ................................. 524/69 |
| 4,650,820 | 3/1987 | Decroix ............................... 524/69 |

FOREIGN PATENT DOCUMENTS

| | | | |
|---|---|---|---|
| 162561 | 11/1985 | European Pat. Off. ............. | 524/64 |
| 2406286 | 8/1974 | Fed. Rep. of Germany ........ | 524/64 |
| 2546131 | 4/1976 | Fed. Rep. of Germany ........ | 524/64 |

*Primary Examiner*—John C. Bleutge
*Assistant Examiner*—David W. Woodward
*Attorney, Agent, or Firm*—John W. Ditsler

[57] ABSTRACT

Paving binders, especially hot mix paving structures, may be modified to have both storage stability and increased creep resistance by the addition of copolymers of ethylene with vinyl acetate or lower alkyl esters of acrylic acid and methacrylic acid to the asphalt used in said binder, provided the asphalt has an asphaltene content of about 7 wt. % or less.

11 Claims, 3 Drawing Sheets

FLOW RESISTANT ASPHALT PAVING BINDER

CROSS-REFERENCE TO RELATED APPLICATION

This application is a continuation-in-part of U.S. Ser. No. 021,189, filed Mar. 3, 1987, now abandoned.

BACKGROUND OF THE INVENTION

1. Field of the Invention

This invention relates to asphalt paving binders having enhanced resistance to creep and their method of preparation.

2. Discussion of Related Art

Asphalt is a bituminous material resulting from the distillation of crude oil. Typically, asphalt is derived from the bottoms of a vacuum distillation tower and has an atmospheric boiling point of at least 380° C. Because it is hydrophobic and has good adhesiveness and weatherability, asphalt has been used widely as a binder in paving materials and as a coating for roofing shingles.

When used in roofing applications (e.g. a shingle coating or a saturant), asphalt is usually polymerized by undergoing oxidative dehydrogenation in which the asphalt is contacted with an oxygen-containing gas (usually air) at temperatures ranging between about 200° and about 300° C. for between about 6 and about 24 hours. This procedure is described in detail by L. W. Corbett in "Bituminous Materials: Asphalts, Tars and Pitches", Interscience Publishers, New York (1965) and by E.J. Barth in "Asphalt Science and Technology", Gordon and Breach Science Publishers, New York (1968), the disclosures of each being incorporated herein by reference. Oxidative dehydrogenation improves the creep (i.e. flow) resistance and weatherability of the asphalt, and reduces its sensitivity to temperature changes.

When used as a conventional paving binder, the asphalt does not usually undergo oxidative dehydrogenation, but rather, is manufactured to meet certain control specifications such as flash point (ASTM D-92), penetration at 25° C. (ASTM D-5), apparent viscosity at 60° C. (ASTM D-2171) and kinematic viscosity at 135° C. (ASTM D-2170). In addition to the control specifications, a paving asphalt should also meet certain performance specifications such as ductility (ASTM D-113), solubility in trichloroethylene (ASTM D-2042), and thin film oven aging (ASTM D-1754).

In the past, asphalts which met the above-mentioned control and performance specifications were generally considered more than adequate as paving binders. However, more recently, asphalt users have been demanding higher performance products. For example, today's increased heavy truck traffic volume is stressing and destroying roads. One of the major problems resulting from this increased traffic loading is pavement rutting due to the natural tendency of asphalt to creep over a period of time, particularly during the increased temperatures of summer. Therefore, road construction contractors are now in serious need of paving asphalt binders which have an increased resistance to creep.

In general, there are two basic methods which are typically employed to change or adjust the rheological and chemical properties of an asphalt: (1) blend resins and oils into said asphalt, or (2) incorporate certain additives such as chemical compounds and polymers into the asphalt. Several examples of the latter method are mentioned below.

U.S. Pat. No. 3,249,567 discloses the use of ethylene copolymers to lower the penetration value of bitumens.

U.S. Pat. No. 3,985,694 discloses an asphalt composition that contains synthetic terpene resins as well as interpolymers of ethylene and vinyl acetate and an organic acid.

European Pat. No. 162,561 discloses an ethylene vinyl acetate containing asphalt formulation for surface dressing of roads. Similarly, German Patent DE No. 3027279A1 discloses a surface dressing composition which includes coal tar, bitumen and ethylene-vinyl acetate.

Japanese Pat. No. 83,047424 discloses the use of ethylene copolymers in asphalt paving materials to improve resistance to temperature changes.

U.S. Pat. No. 4,560,414 discloses a method of preparing a paving asphalt composition with improved flow resistance by incorporating granulated Trinidad Epure therein as well as pulverulent solids to prevent recaking of the Trinidad Epure. Among the pulverulent solids listed are polymeric resins.

U.S. Pat. No. 3,980,598 discloses a mixture comprising from 97 to 3 wt. % asphalt and from 3 to 97 wt. % ethylene copolymer in which the asphalt is a deasphalted asphalt having a penetration of less than 10 at 25° C. No mention is made of the asphaltene content except for an example which shows an asphalt having 8.5 wt. % asphaltenes in mixture with 50 wt. % polymer.

Finally, U.S. Pat. Nos. 4,451,598 and 4,650,820 disclose bitumen-terpolymer compositions. The wt. % bitumen and terpolymer ranged from 35 to 95 and 5 to 65, respectively, in the '598 patent, and from 95 to 99 and 1 to 5, respectively, in the '820 patent. No mention is made of the asphaltene content of the bitumen.

Thus, the prior art does not teach or suggest that the asphalt used in an ethylene copolymer modified paving binder must have an asphaltene content below a critical level if the binder is to be both storage stable and have enhanced creep resistance.

SUMMARY OF THE INVENTION

Now according to the present invention, it has been discovered that paving asphalts (especially of the hot mix, hot laid type) may be modified so as to have improved stability and rheological properties by the addition of certain copolymers of ethylene with vinyl acetate or lower alkyl esters of acrylic acid and methacrylic acid to an asphalt, provided said asphalt has an asphaltene content below a critical level. More specifically, an asphalt cement or binder having both enhanced storage stability and creep resistance relative to conventional binders (i.e. straight-run asphalts obtained from residua from vacuum distillation of crude oil) is formed when the asphalt used in said binder has an asphaltene content of about 7 wt. % or less, based on wt. % of the asphalt. The ethylene-vinyl acetate, ethylene-alkyl acrylate or ethylene-alkyl methacrylate copolymer added to the asphalt in accordance with the practice of the present invention should have a melt index of from about 0.3 to about 20 g/10 min. and a vinyl acetate, acrylate or methacrylate content of from 3 to about 30 wt. %. The amount of copolymer used with said asphalt should range from about 3.5 to about 10%, based on the total weight of polymer and asphalt.

The composition of the present invention is particularly suitable for use as a binder in the load bearing course as well as the top or surface course of pavement structures, particularly hot mix pavement structures. Thus, in one embodiment of the present invention there is provided an improvement in pavement structures wherein the binder in said structures comprises an asphalt containing about 7 wt. % or less asphaltenes and from about 3.5 to about 10% by weight of a copolymer of ethylene with from 3 to about 30 wt. % vinyl acetate, alkyl acrylate or alkyl methacrylate.

In yet another embodiment, the present invention relates to a method of improving both the storage stability and creep resistance of asphalt paving binders by incorporating into the asphalt used in said binders from about 3.5 to about 10 wt. % of a copolymer of ethylene which contains from 3 to about 30 wt. % vinyl acetate, alkyl acrylate or alkyl methacrylate.

DETAILED DESCRIPTION OF THE INVENTION

Figure 1:
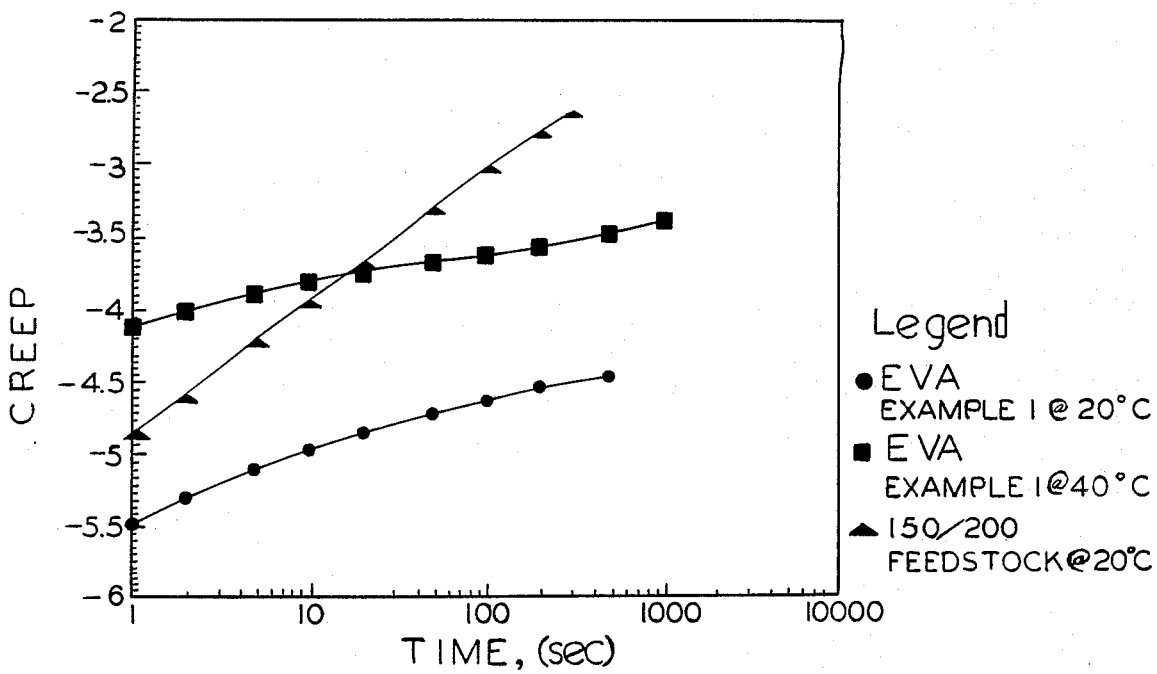
FIGS. 1 to 5 are graphs showing the creep resistance of various asphalt paving binders versus time.

According to the present invention, asphalt paving binders which exhibit an increased resistance to creep or deformation may be formed by adding or incorporating into the asphalt used in said binder from about 3.5 to about 10% by weight of a copolymer of ethylene and from 3 to 30 wt. % vinyl acetate, alkyl acrylate or alkyl methacrylate. Preferably, the alkyl group of the alkyl acrylate and alkyl methacrylate will be methyl, ethyl, or butyl. Importantly, only copolymers which have a melt index in the range of from about 0.3 to about 20 g/10 min. and ethylene contents of from about 70 to 97 wt. % are suitable. Optionally, but preferably, the copolymer may have from about 0.3 to about 0.8% by weight of maleic anhydride grafted onto the ethylene-vinyl acetate or alkyl acrylate or alkyl methacrylate copolymer.

The amount of copolymer added to the asphalt should range from about 3.5 (preferably from about 4) to about 10 wt. %. An amount below about 3.5 wt. % will result in a paving binder having unacceptable creep resistance while amounts greater than about 10 wt. % result in a product with a viscosity that renders the product impractical and unsuitable for use as a paving binder, particularly a hot mix paving binder. Typically, the viscosity of the paving binder of the present invention should not exceed about 1200 cSt at 135° C.

The asphalt used must be low in asphaltenes to ensure both satisfactory creep resistance and storage stability of the binder. To obtain these benefits, it is critical that the asphalt (or blend of asphalts) to which the copolymer is added contain about 7 wt. % or less asphaltenes (for example, from 0% to about 7 wt. %) based on wt. % of the asphalt. Preferably the asphaltene content will be about 6.5 wt. % or less, most preferably about 6.0 wt. % or less.

The asphalt may be obtained from a variety of sources including straight-run vacuum residue; mixtures of vacuum residue with diluents such as vacuum tower wash oil, paraffin distillate, aromatic and naphthenic oils and mixtures thereof; oxidized vacuum residues or oxidized mixtures of vacuum residues and diluent oils and the like. Other asphaltic materials such as coal tar pitch, rock asphalt and naturally occurring asphalt may also be used. Typically, the asphalt will have an atmospheric boiling point of at least 380° C., more typically at least 440° C., and will comprise at least about 85, preferably at least about 90, more preferably at least about 95, wt. % of the binder.

In a particularly preferred embodiment of the present invention, the asphalt paving binder will contain from about 4 to about 6 weight percent of an ethylene vinyl acetate copolymer having a melt index of about 1 to about 5 g/10 min. and a vinyl acetate content of from about 3 to about 12 wt. %.

When the asphalt is modified with an ethylene methacrylate copolymer, it is particularly preferred that the asphalt binder contain from about 4 to about 5 wt. % of maleic anhydride-grafted ethylene methacrylate copolymer having a melt index of from about 3 to about 5 g/10 min., a methyl-acrylate content of about 20 wt. % and a maleic anhydride content of from about 0.3 to about 0.8 wt. %.

The asphalt may be mixed or blended with the copolymer in any number of ways which can readily be selected by one skilled in the art. Suitable means include external mixers, roll mills, internal mixers, Banbury mixers, screw extruders, augers and the like. Blending times can range broadly; i.e. from about 1 hour to about 8 hours or more. Typically, blending times of about 1 to about 4 hours will be employed.

Similarly, the particular conditions at which the asphalt is blended with the copolymer are not critical. Typically, the blending will be performed at ambient pressure and at a temperature between about 150° and about 300° C., preferably between about 150° and about 230° C.

The present invention will be further understood by reference to the following Examples which are not intended to restrict the scope of the claims appended hereto. In the Examples, the storage stability and creep resistance of the paving binders tested were measured as follows:

STORAGE STABILITY

A 200 gram sample is placed in a copper tube (10 inches high and 1 inch in diameter) and heated at 160° C. for 5 days. Then the sample is removed from the tube and divided into top and bottom fractions. The viscosity of each fraction is measured at 135° C. The ratio of the top over the bottom viscosity at 135° C. is then calculated. A ratio of 0.90 to 1.1 is preferred; 0.8–0.9 and 1.1–1.2 is borderline; and less than 0.8 or more than 1.2 is a failure.

CREEP RESISTANCE

The sliding plate rheometer is used to measure the creep resistance and shear of the asphalts tested over a continuous range of loading times following the procedure set forth by Fenijn and Krooshof in "Proceedings of CTAA", Winnipeg, Canada, November 1970, the disclosure of which is incorporated herein by reference. In the Examples, data were obtained at 20° and/or 40° C. since asphalt pavement will be prone to rutting under heavy loads at these temperatures. From these data, creep resistance (i.e. log creep compliance in square meters per newton) was plotted against time to show the creep behavior of the composition. If the composition creeps or flows with time, the curve will slope upwards. If the composition has good flow resistance, the curve will tend to become horizontal and flatten or plateau.

EXAMPLE 1

EVA Polymer Modified Asphalt Preferred to Unmodified Asphalt

In this example, 38.4 grams of ethylene vinyl acetate (EVA) having a 3.3 to 4.0 melt index (M.I.) and 9±1 wt. % vinyl acetate content (% VA) were blended into 729.2 grams of vacuum residue having a 204 penetration at 25° C. and containing less than 5 wt. % asphaltenes. The final concentration of polymer in the blend was 5.0 wt. %. The blending operation was conducted at 190° C. for two hours in a baffled autoclave equipped with a stirrer rotating at 1750 rpm. The properties of the EVA modified paving binder were determined as were the corresponding properties of an unmodified vacuum residue having a 194 penetration at 25° C. The results are summarized in Table 1 and shown in FIG. 1.

TABLE 1

|  | Unmodified Asphalt | EVA-Modified Asphalt |
|---|---|---|
| Feed Inspections |  |  |
| Asphalt: |  |  |
| Wt. % | 100 | 95 |
| Asphaltenes, wt. % | <5 | <5 |
| Penetration at 25° C. | 194 | 204 |
| Polymer: |  |  |
| Wt. % | 0 | 5 |
| Melt Index, g/10 min | — | 3.3–4.0 |
| Product Inspections |  |  |
| Softening Point, °C. | 41.0 | 78.8 |
| Penetration at |  |  |
| 25° C. | 194.0 | 98.0 |
| 10° C. | 26.0 | 21.3 |
| 4° C. | 14.0 | 11.7 |
| Penetration Index | −2.19 | −0.64 |
| Viscosity: |  |  |
| 60° C., Pa.S | 29.6 | 543.9 |
| 135° C., cSt | 163.0 | 492.3 |
| Storage Stability | 1.00 | 1.05 |
| Creep Resistance at 20° and 40° C. (See FIG. 1) | Poor at 20° C. (1) | Excellent |

(1) Test performed only at 20° C. because sample too soft to measure at 40° C.

The data in Table 1 show that the unmodified asphalt has acceptable storage stability but unacceptable creep resistance at 20° and 40° C. In contrast, the EVA-modified asphalt has excellent storage stability and creep resistance at 20° and 40° C.

EXAMPLE 2

Maleated EVA Polymer Modified Asphalt Preferred to Unmaleated EVA Polymer Modified and Unmodified Asphalts Using the procedure of Example 1, 43.9 grams of 4.0 M.I. EVA (27% VA) were blended into 834 grams of a vacuum residue having a 204 penetration at 25° C. and containing less than 5 wt. % asphaltenes to form a blend having a polymer content of 5 wt. %.

Figure 2:
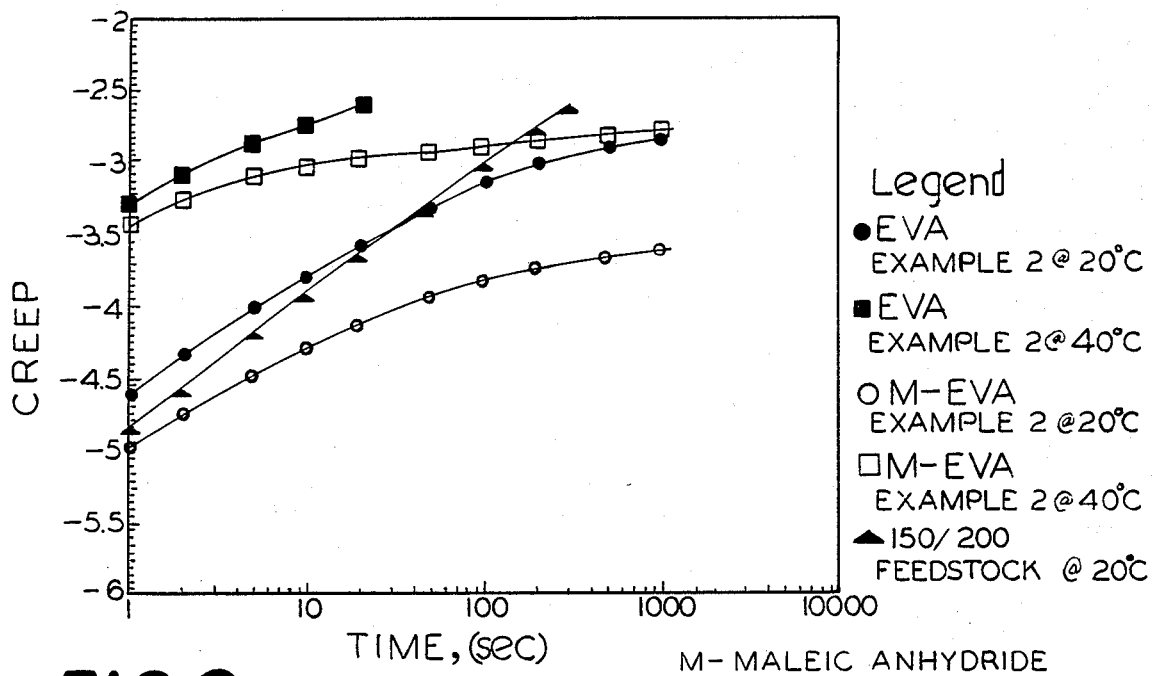

Using the same procedure, 0.5 to 0.6 wt. % maleic anhydride was grafted onto the same EVA copolymer. Then 27 grams of the maleated EVA were blended into 513.1 grams of vacuum residue having a 201 penetration at 25° C. and containing less than 5 wt. % asphaltenes to give a final polymer concentration of 5 wt. %. The properties of the un-maleated and maleated products were evaluated as were the corresponding properties of an unmodified vacuum residue having a 194 penetration at 25° C. The results are summarized in Table 2 and shown in FIG. 2.

TABLE 2

|  | Unmodified Asphalt | EVA-Modified Asphalt | Maleated EVA-Modified Asphalt |
|---|---|---|---|
| Feed Inspections |  |  |  |
| Asphalt: |  |  |  |
| Wt. % | 100 | 95 | 95 |
| Asphaltenes, wt % | <5 | <5 | <5 |
| Penetration at 25° C. | 194 | 204 | 201 |
| Polymer: |  |  |  |
| Wt. % | 0 | 5 | 5 |
| Melt Index, g/10 mins | — | 4 | 4 |
| Product Inspections |  |  |  |
| Softening Point, °C. | 41.0 | 54.3 | 58.0 |
| Penetration at |  |  |  |
| 25° C. | 194.0 | 133.5 | 111.0 |
| 10° C. | 26.0 | 29.3 | 25.7 |
| 4° C. | 14.0 | 11.0 | 13.0 |
| Penetration Index | −2.19 | −1.01 | −0.49 |
| Viscosity: |  |  |  |
| 60° C., Pa.S | 29.6 | 73.5 | 92.7 |
| 135° C., cSt | 163.0 | 529.2 | 590.8 |
| Storage Stability | 1.00 | 0.97 | 0.99 |
| Creep Resistance at 20° and 40° C. (See FIG. 2) | Poor at 20° C. (1) | Fair | Excellent |

(1) Test performed only at 20° C. because sample too soft to measure at 40° C.

The data in Table 2 show that grafting of maleic anhydride onto ethylene vinyl acetate produces a copolymer modified asphalt which has improved rheological performance over that of the un-maleated polymer modified asphalt.

EXAMPLE 3

Maleated EMA Polymer Modified Asphalt Preferred to Unmaleated EMA Polymer Modified and Unmodified Asphalts Using the procedure of Example 1, 32.8 grams of 4.4 M.I. 20% methyl acrylate (MA) were blended into 624 grams of a vacuum residue having a 201 penetration at 25° C. and containing less than 5 wt. % asphaltenes to give a 5 wt. % polymer content blend.

Figure 3:
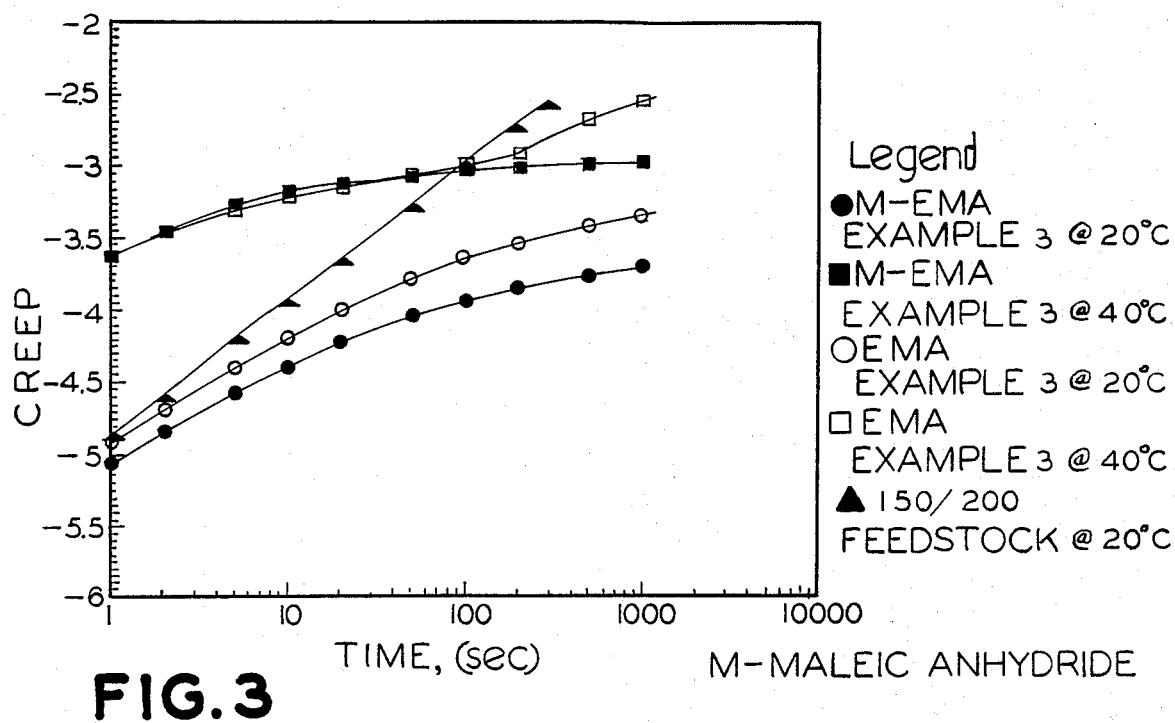

Using the same procedure, 0.3 to 0.8 wt. % maleic anhydride was grafted onto the same EMA copolymer. Then 39.4 grams of the maleated EVA were blended into 748.9 grams of 204 penetration at 25° C. vacuum residue having less than 5 wt. % asphaltenes to give a final polymer concentration of 5 wt. %. The properties of the un-maleated and maleated products were evaluated as were the corresponding properties of an unmodified vacuum residue having a 194 penetration at 25° C. The results are summarized in Table 3 and shown in FIG. 3.

TABLE 3

|  | Unmodified Asphalt | EMA-Modified Asphalt | Maleated EMA-Modified Asphalt |
|---|---|---|---|
| Feed Inspections |  |  |  |

TABLE 3-continued

|  | Unmodified Asphalt | EMA-Modified Asphalt | Maleated EMA-Modified Asphalt |
|---|---|---|---|
| Asphalt: | | | |
| Wt. % | 100 | 95 | 95 |
| Asphaltenes, wt % | <5 | <5 | <5 |
| Penetration at 25° C. | 194 | 201 | 204 |
| Polymer: | | | |
| Wt. % | 0 | 5 | 5 |
| Melt Index, g/10 mins. | — | 4.4 | 4.4 |
| Product Inspections | | | |
| Softening Point, °C. | 41.0 | 62.1 | 68.0 |
| Penetration at | | | |
| 25° C. | 194.0 | 115.0 | 112.0 |
| 10° C. | 26.0 | 24.0 | 27.5 |
| 4° C. | 14.0 | 12.8 | 13.7 |
| Penetration Index | −2.19 | −0.82 | −0.27 |
| Viscosity: | | | |
| 60° C., Pa.S | 29.6 | 68.4 | 103.0 |
| 135° C., cSt | 163.0 | 531.0 | 624.4 |
| Storage Stability | 1.00 | 0.95 | 1.04 |
| Creep Resistance at 20° and 40° C. (See FIG. 3) | Poor at 20° C. (1) | Fair | Excellent |

(1) Test performed only at 20° C. because sample too soft to measure at 40° C.

The data in Table 3 show that grafting of maleic anhydride onto ethylene methyl acrylate produces a copolymer modified asphalt which has excellent rheological performance compared with the un-maleated polymer modified asphalt.

EXAMPLE 4

Minimum Polymer Concentration in Paving Binder

Figure 4:
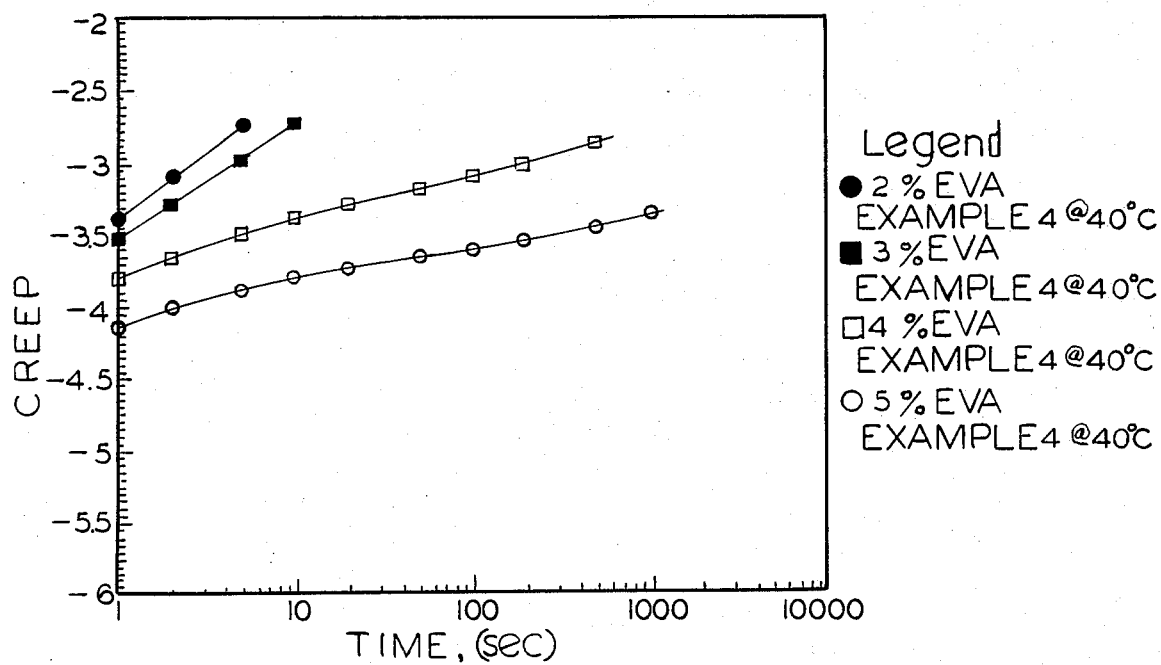

In this example, paving binders having 2, 3, and 4 wt. % EVA were prepared. For the 2 wt. % case, 14.7 grams of ethylene vinyl acetate (EVA) having a 3.3 to 4.0 melt index (M.I.) and containing 9±1 wt. % VA were blended into 620.6 grams of vacuum residue having a 204 penetration at 25° C. and containing less than 5 wt. % asphaltenes. For the 3 wt. % EVA case, 21.4 grams of the same EVA copolymer were blended into 691.2 grams of the same residue. For the 4 wt. % case, 25.3 grams of the same EVA grade were blended into 607 grams of a vacuum residue having a 193 penetration at 25° C. The properties of the resulting paving binders were determined and compared with the corresponding properties of the 5 wt. % EVA binder from Example 1. The results are summarized in Table 4 and shown in FIG. 4.

TABLE 4

| Feed Inspections | | | | |
|---|---|---|---|---|
| Polymer: | | | EVA | |
| Wt. % | 2 | 3 | 4 | 5 (Ex. 1) |
| Melt Index, g/10 mins. | | | 3.3–4.0 | |
| Asphalt: | | | | |
| Wt. % | 98 | 97 | 96 | 95 |
| Asphaltenes, wt % | | | <5 | |
| Penetration at 25° C. | 204 | 204 | 193 | 204 |
| Product Inspections | | | | |
| Softening Point, °C. | 48.4 | 72.0 | 76.0 | 78.8 |
| Penetration at | | | | |
| 25° C. | 168.5 | 129.7 | 105.0 | 98.0 |
| 10° C. | 25.0 | 22.7 | 19.0 | 21.3 |
| 4° C. | 12.3 | 10.0 | 12.0 | 11.7 |
| Penetration Index | −1.98 | −1.60 | −1.15 | −0.64 |
| Viscosity: | | | | |
| 60° C., Pa.S | 58.8 | 86.4 | 309.0 | 543.9 |
| 135° C., cSt | 257.4 | 285.4 | 405.0 | 492.3 |
| Creep Resistance at 40° C. (See FIG. 4) | Poor | Poor | Good | Excellent |

The data in Table 4 show that acceptable creep resistance is obtained only when the asphalt paving binder has a polymer content of about 3.5 wt. % or greater.

EXAMPLE 5

Effect of Asphaltene Concentration on Storage Stability and Creep Resistance

Following the procedure of Example 1, blends of 5 wt. % ethylene vinyl acetate (EVA) with a melt index ranging from 3.3–4 and 9±1 wt. % VA were made with the following asphalt blends:
(i) a straight-run vacuum residue having a penetration of greater than 400 at 25° C. and no asphaltenes;
(ii) a blend of (1) a straight-run vacuum residue having a 276 penetration at 25° C. and 3.9 wt. % asphaltenes, and (2) 9 wt. % of a paraffin lube distillate having no asphaltenes;
(iii) a blend of (1) a straight-run asphalt having a 85/95 penetration at 25° C. and 17.13 wt. % asphaltenes and (2) a straight-run asphalt having a 70 penetration at 25° C. and 5.14 wt. % asphaltenes;
(iv) same as (iii);
(v) same as (iii);
(vi) a straight-run asphalt having a 190 penetration at 25° C. and 15 wt. % asphaltenes.

Figure 5:
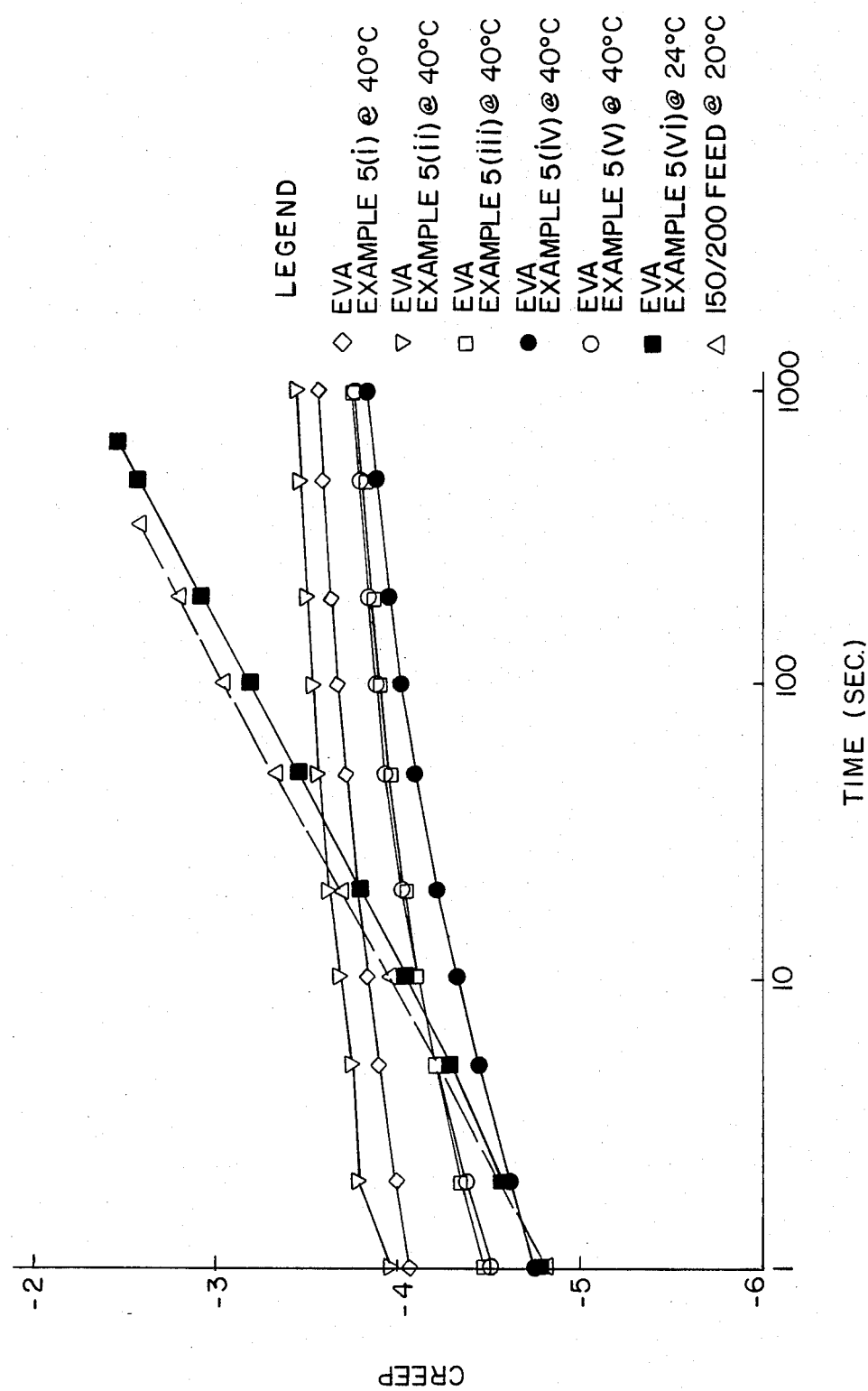

The asphaltene content of each blend was measured by ASTM D 4124. The properties of the resulting paving binders were determined and are summarized in Table 5 and shown in FIG. 5.

TABLE 5

| Sample Identification | (i) | (ii) | (iii) | (iv) | (v) | (vi) |
|---|---|---|---|---|---|---|
| Feed Inspections | | | | | | |
| Polymer: | | | | | | |
| Wt % | | | | EVA 5 | | |
| Melt Index, g/10 mins. | | | | 3.3–4.0 | | |
| Asphalt: | | | | | | |
| Wt. % | | | | 95 | | |
| Asphaltenes, wt. % | 0 | 3.5 | 5.7 | 6.5 | 8.4 | 15 |
| Product Inspections | | | | | | |
| Softening Point, °C. | 87.0 | 77.8 | 91 | 90 | 88 | 47.0 |
| Penetration at | | | | | | |

TABLE 5-continued

| Sample Identification | (i) | (ii) | (iii) | (iv) | (v) | (vi) |
|---|---|---|---|---|---|---|
| 25° C. | 177.30 | 185.0 | 38 | 38 | 43 | 99.3 |
| 10° C. | 34.2 | 39.0 | 8 | 11 | 10 | 30.3 |
| 4° C. | 17.0 | 21.0 | 3 | 4 | 5 | 16.7 |
| Penetration Index | 0.95 | −0.78 | −1.2 | −0.03 | −0.49 | 0.85 |
| Viscosity: | | | | | | |
| 60° C., Pa.S | 551.7 | 238.0 | (1) | 6374 | (1) | (1) |
| 135° C., cSt | 367.5 | 350.0 | 1074 | 1111 | 1162 | 997 |
| Storage Stability | 0.93 | 0.94 | 1.0 | 1.2 | 1.4 | 4.9 |
| Creep Resistance at 40° C. (See FIG. 5) | | | Excellent | | | Poor (2) |

(1) Too high to measure.
(2) Test performed only at 24° C. because sample too soft to measure at 40° C.

The data in Table 5 show that a paving binder having both acceptable storage stability and creep resistance is obtained only if the asphaltene content of the asphalt used in said binder is about 7 wt. % or less

EXAMPLE 6

Effect of Vinyl Acetate Content on Paving Binder

In this example, 40.9 grams of EVA with a 4.0 M.I. and containing 40 wt. % VA were blended into 776.9 grams of vacuum residue having a 201 penetration at 25° C. and containing less than 5 wt. % asphaltenes to give a 5 wt. % EVA concentration. The properties of the resulting paving binders were determined and compared with the corresponding properties of the 5 wt. % EVA binder from Example 1. The results are summarized in Table 6.

TABLE 6

| | EVA (40% VA) | EVA (9% VA) |
|---|---|---|
| Feed Inspections | | |
| Polymer: | | |
| Wt. % | 5 | |
| Melt Index, g/10 mins. | 3.3–4.0 | |
| Asphalt: | | |
| Wt. % | 95 | |
| Asphaltenes, wt % | <5 | |
| Penetration at | | |
| 25° C. | 201 | 204 |
| Product Inspections | | |
| Softening Point, °C. | 39.2 | 78.8 |
| Penetration at | | |
| 25° C. | 118.3 | 98.0 |
| 10° C. | 32.3 | 21.3 |
| 4° C. | 13.8 | 11.7 |
| Penetration Index | −0.02 | −0.64 |
| Viscosity: | | |
| 60° C., Pa.S | 42.5 | 543.9 |
| 135° C., cSt | 255.0 | 492.3 |
| Creep Resistance at +40° C. | (1) | Excellent |

(1) Not possible to measure because of gross separation

The data in Table 6 show that high vinyl acetate content EVA does not produce a modified paving binder with acceptable creep resistance.

EXAMPLE 7

Effect of Varying Polymer Melt Index and Vinyl Acetate Content

Several blends were made according to the procedure used in Example 1:
(i) 54.8 grams of EVA with 2500 M.I. and 14% VA were blended with 1041 grams of 201 penetration at 25° C. vacuum residue having less than 5% asphaltenes.
(ii) 39.2 grams of EVA with 2500 M.I. and 28% VA were blended with 744.4 grams of 201 penetration at 25° C. vacuum residue having less than 5% asphaltenes.
(iii) 36.1 grams of EVA with 45 M.I. and 33% VA were blended with 685.0 grams of 201 penetration at 25° C. vacuum residue having less than 5% asphaltenes.
(iv) 37.4 grams of EVA with 150 M.I. and 19% VA were blended with 771.0 grams of 201 penetration at 25° C. vacuum residue having less than 5% asphaltenes.

The properties of the resulting products were determined and are summarized in Table 7.

TABLE 7

| Sample Identification | (i) | (ii) | (iii) | (iv) | (v) |
|---|---|---|---|---|---|
| Feed Inspections | | | | | |
| Polymer: | EVA (14% VA) | EVA (28% VA) | EVA (33% VA) | EVA (19%) | EVA (9% VA) |
| Wt. % | | | 5 | | |
| Melt Index, g/10 mins. | 2,500 | 2,500 | 45 | 150 | 3,3–4.0 |
| Asphalt: | | | | | |
| Wt. % | | | 95 | | |
| Asphaltenes, wt % | | | <5 | | |
| Penetration at 25° C. | | | 201 | | 204 |
| Product Inspections | | | | | |
| Softening Point, °C. | 45.5 | 38.0 | 39.1 | 58.5 | 78.8 |
| Penetration at | | | | | |
| 25° C. | 166.80 | 104.2 | 163.3 | 108.8 | 98.0 |
| 10° C. | 26.70 | 41.3 | 36.5 | 26.3 | 21.3 |
| 4° C. | 11.50 | 15.3 | 14.3 | 11.2 | 11.7 |

TABLE 7-continued

| Sample Identification | (i) | (ii) | (iii) | (iv) | (v) |
|---|---|---|---|---|---|
| Penetration Index | −1.88 | 1.63 | −0.90 | −0.97 | −0.64 |
| Viscosity: | | | | | |
| 60° C., Pa.S | 32.70 | 29.3 | 118.2 | 46.3 | 543.9 |
| 135° C., cSt | 225.0 | 234.0 | 384.0 | 339.0 | 492.3 |
| Creep Resistance | | | | | |
| at +40° C. | (1) | (1) | (1) | (1) | Excellent |

(1) Flows, too soft to measure

The data in Table 7 show that a range of EVA polymers with melt indices and % vinyl acetates outside of the claimed ranges do not form paving binders with acceptable creep resistance.

EXAMPLE 8

Effect of High Copolymer Concentration on Paving Binder Viscosity

In this example, two blends were prepared having different polymer levels.

Using the procedure of Example 1, 32.1 grams of EVA having a 3.3 to 4.0 g/10 mins. MI and 9±1 wt. % VA were blended into 729.9 grams of asphalt which contained a vacuum residue with a 70 penetration at 25° C. and 10 wt. % of a paraffin lube distillate. The asphalt had a viscosity of 1175 cSt at 100° C. The final concentration of copolymer in the blend was 5 wt. %.

A second blend was prepared by mixing 81.04 grams of the same EVA copolymer into 459.2 grams of the same asphalt used to make the first blend. The final concentration of copolymer in this blend was 15 wt. %. The second blend was made using the procedure of Example 1 except that the copolymer was added in 3 increments of about 27 grams per increment. About 15 to 30 minutes separated the addition of each increment to minimize potential damage to the mixer from the high viscosity of the blend.

The properties of the resulting products were determined and are summarized in Table 8.

TABLE 8

| Feed Inspections | EVA (9% VA) | |
|---|---|---|
| Polymer: | | |
| Wt. % | 5 | 15 |
| Melt Index, g/10 mins. | | 3.3–4 |
| Asphalt: | | |
| Wt. % | 95 | 85 |
| Asphaltenes, wt % | | <5 |
| Viscosity at | | |
| 100° C., cSt | 1176 | 1348 |
| Product Inspections | | |
| Softening Point, °C. | 90 | 94 |
| Penetration at | | |
| 25° C. | 70 | 40 |
| 10° C. | 16 | 12 |
| 4° C. | 7 | 6 |
| Penetration Index | −0.71 | 0.62 |
| Viscosity: | | |
| 60° C., Pa.S | (1) | (1) |
| 135° C., cSt | 599 | 6924 |
| Storage Stability | 1.0 | 0.63 |

(1) Too high to measure.

The data in Table 8 show that the presence of 15 wt. % copolymer in the paving binder results in a viscosity at 135° C. that renders the product impractical and unsuitable for use as a paving binder. A larger amount of polymer would result in a product having even greater (and therefore less acceptable) viscosities. In addition, the high copolymer content binder had unacceptable storage stability.

What is claimed is:

1. A storage stable and creep resistant asphalt paving binder which comprises
   (a) an asphalt having about 7 wt. % or less asphaltenes, and
   (b) from about 3.5 to about 10 wt. % of a copolymer consisting essentially of ethylene with at least one compound selected from the group of vinyl acetate, alkyl acrylate or alkyl methacrylate, wherein said copolymer has a melt index of from about 0.3 to about 20 g/10 mins. and contains from about 70 to about 97 wt. % ethylene.

2. The binder of claim 1 wherein the alkyl is methyl, ethyl or butyl.

3. The binder of claim 2 wherein said copolymer has from about 0.3 to about 0.8 wt. % maleic anhydride grafted thereon.

4. The binder of claim 1 wherein said copolymer is ethylene with from about 3 to about 12 wt. % vinyl acetate and has a melt index of from about 1 to about 5 g/10 mins.

5. The binder of claim 4 wherein from about 4 to about 6 wt. % of said copolymer is present therein.

6. The binder of claim wherein said copolymer is ethylene with about 20 wt. % alkyl methacrylate and has a melt index of from about 3 to about 5 g/10 mins.

7. The binder of claim 6 wherein from about 0.3 to about 0.8 wt. % maleic anhydride is grafted onto said copolymer.

8. The binder of claim 7 wherein from about 4 to about 5 wt. % of said copolymer is present therein.

9. A pavement structure containing an asphalt paving binder which comprises an asphalt containing from 0 to about 7 wt. % asphaltenes and from about 3.5 to about 10 wt. % of a copolymer of vinyl acetate, alkyl acrylate or alkyl methacrylate, said copolymer having a melt index from about 0.3 to about 20 g/10 mins. and an ethylene content between about 70 and about 97 wt. %.

10. The pavement structure of claim 9 wherein the alkyl is methyl, ethyl or butyl.

11. The pavement structure of claim 9 wherein said copolymer has from about 0.3 to about 0.8 wt. % maleic anhydride grafted thereon.

* * * * *